2 Sheets--Sheet 2.
V. H. De FORVILLE.
Portable Telegraph Apparatus
No. 151,101. Patented May 19, 1874.
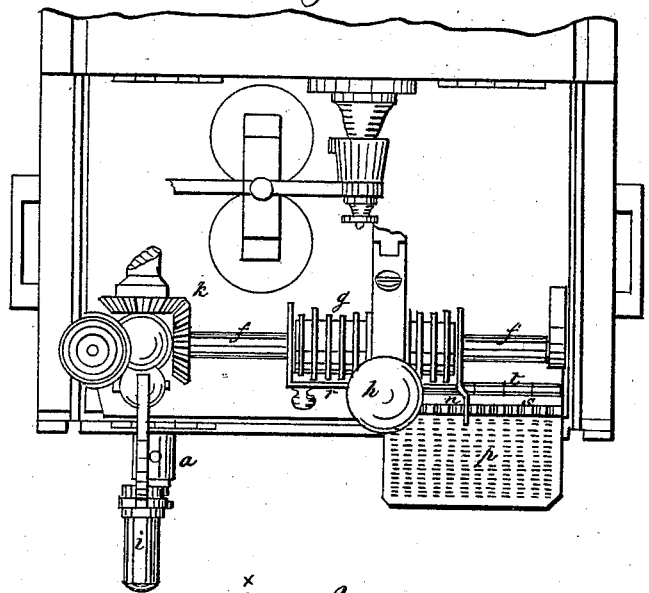
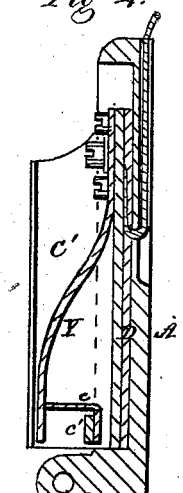
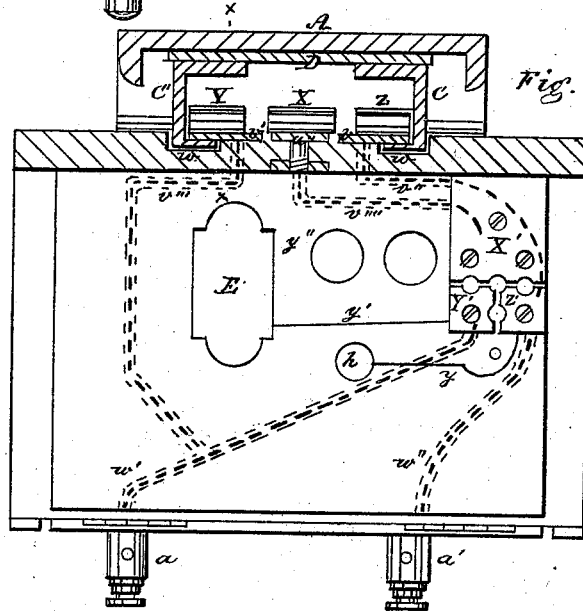

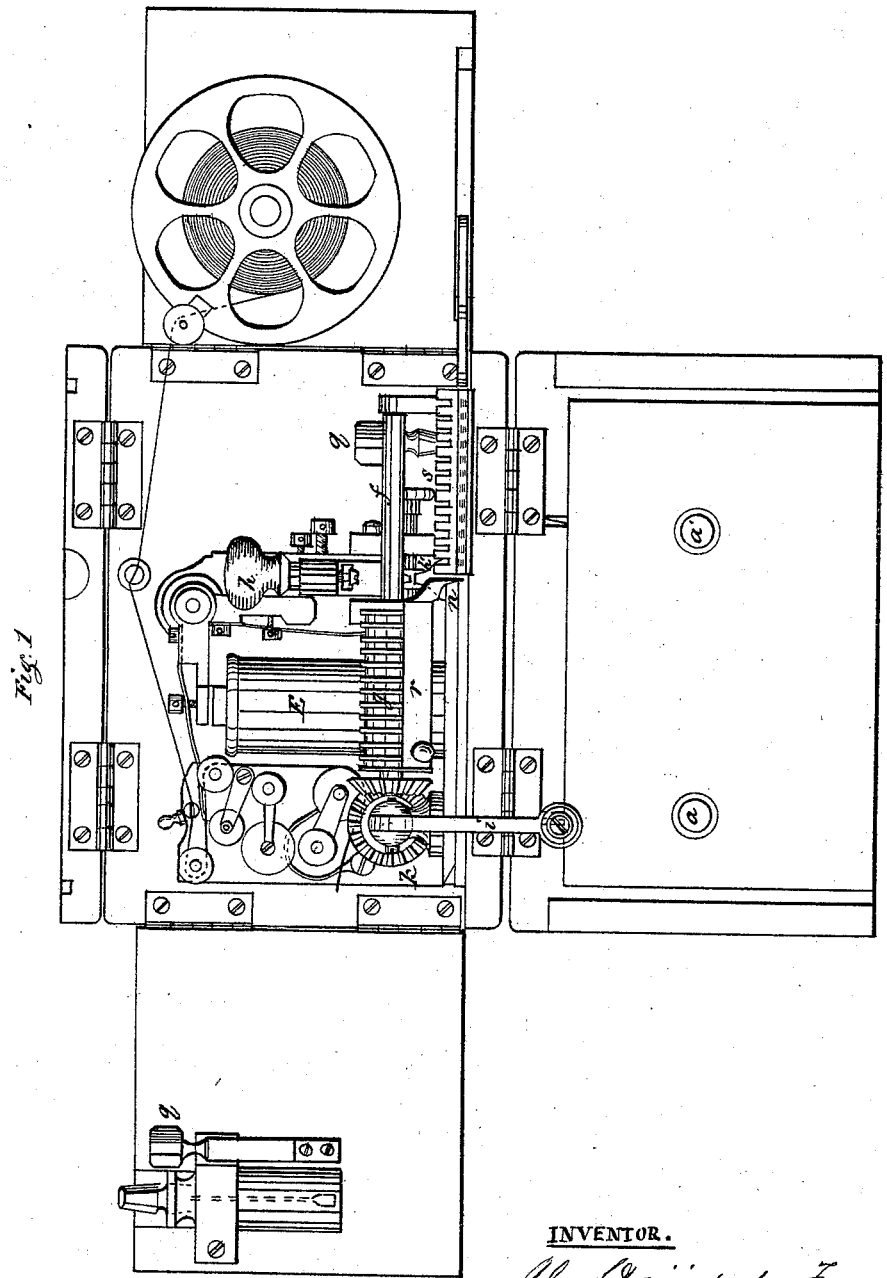

UNITED STATES PATENT OFFICE.

VALENTINE HAÜY DE FORVILLE, OF ST. PETERSBURG, RUSSIA.

IMPROVEMENT IN PORTABLE TELEGRAPH APPARATUS.

Specification forming part of Letters Patent No. 151,101, dated May 19, 1874; application filed February 24, 1874.

*To all whom it may concern:*

Be it known that I, the Marquis VALENTINE HAÜY DE FORVILLE, of St. Petersburg, in the Empire of Russia, have invented Improvements in Portable Telegraphing Apparatus for use on Railroad-Trains, of which the following is a specification:

This invention, in the main, consists of improvements on an apparatus for which I filed an application for Letters Patent on the 9th day of April, 1873. I shall, therefore, give but a brief description here of those features common to both.

I will now describe it by reference to the accompanying drawing, in which—

Figure 1 represents a front or face view of the apparatus as arranged for use. Fig. 2 is a plan or top view of the apparatus in part, the top and front of the case only being open. Fig. 3 shows a plan of the connections of the electric current with the magnet and wires, and the changes of which said current is susceptible. Fig. 4 represents a vertical section of the bracket for making connections of the instrument with the main line, taken on the line *x x* of Fig. 3, its cover being shown in similar section.

The same letters appearing on the several figures indicate like parts.

The instrument is to be arranged for operation as represented in Fig. 1, and the connections made through the serre-fils or thumb-screws *a a'* with one or both ends of the severed telegraph-wire; if with both it forms a connection with the main wire to both right and left, without destroying the continuity of the through line; if with one only the other serre-fil must be connected by a wire with the ground.

I prefer, when practicable, to provide brackets or commutators at convenient distances apart, with which the main wire is connected in such manner as not to interfere with the through current when the portable instrument is not in use, and through which the electric current may be made to traverse the line in either direction, according to the position of the plug *q*, as hereinafter described, the connections being formed by the contact of the springs X Y Z with the wires and with the ground. These connections, to form the circuit of the electric current, are indicated in Fig. 3, through the plates X' Y' Z', which, by the interposition of the plug *q*, forms the circuit of the main line when the latter is placed between the plates Y' and Z', and with the ground when between either of those and the plate X', through the spring X or its contact-bars *a''*, to either of which the ground-wire must be attached, and the main-wire connection made on the right or left at *a'* or *a*, as desired.

The magnet, armature, tape-reel, and printing devices are all similar to those commonly used in the Morse system, as also in my previous application, therefore need no further description here.

The shaft *f*, with its series of cams *g*, the latter having a sliding motion on said shaft, and in spline gear, so as to rotate therewith, and to be moved along said shaft until a particular one of said cams is brought under the finger lever or key *h*, is to be rotated by means of the crank-handle *i*, through the bevel-gears *k*, and when turned to the right will communicate the word or sign thereof to which the index-finger *n* points, beginning with a hyphen or dash, and when turned to the left, or in the reverse direction, will indicate the finger or numeral in rear of such word on the plate *p*, commencing with a point, in which manner messages may be sent by a person entirely unskilled in telegraphy. A yoke, *r*, spans the series of cams *g*, by which they are caused to slide on the shaft *f*. This yoke is provided with a pointer or index, *n*, and is free to turn up or down on its axis *f*. The signal-plate, on which the series of messages are engraved, has a comb or rack, *s*, at its rear edge, the notches in which are in line with the rows of words engraved upon said plate *p*, and in one of these notches the index *n* is caused to rest to prevent any possibility of the cams *g* slipping to the right or left during the sending of a message. This signal-plate is also hinged to the frame of the machine at *t*, so that when out of use it may be turned upward, whereby the apparatus is rendered extremely compact. The stationary bracket for the attachment of the portable instrument consists of a cast-iron case, A, with a hinged cover, B, for inclosing the parts through which the continuation of the main line is formed, and by which the magnet of the portable instrument is brought within the circuit for operation. On the inside of the back part of this case or bracket A are attached two metallic slides, C C', which are insulated therefrom by a sheet of rubber, D, or other suitable material, and on the back of the portable instrument are two metal plates, $v$, partially covering two vertical grooves or recesses, $w$, therein, which, when the instrument is applied, receive the outer faces of the slides C C', which, through the medium of the springs Y Z, complete the connection of the main wire through the instrument, the right-hand end of the main wire being in contact with the spring Z, and the left-hand one with the spring Y, while the central spring X forms the ground connection, any two of which may be controlled by adjusting the position of the plug $q$; the right-hand connection of the main wire being through the slide C, spring Z, plate $v$, and wire $v'''$ with the plate Z', and the left-hand one through the slide C', spring Y, plate $v'$, and wire $v'''$ with the plate Y', thus completing the circuit of the main wire through the instrument by the interposition of the plug $q$ between the plates Y' and Z', while the plate X' is connected with the ground-wire $v''''$, boss $a''$, and spring X, with which said ground-wire is connected, and which may be put in connection with the right or left hand wire by the interposition of the plug $q$ between the plates Z' and X', or between Y' and X', as desired. These wire connections $v''$, $v'''$, and $v''''$, as also those marked $w'$ and $w''$, forming connections with the serre-fils $a$ and $a'$, are all embedded in grooves in the bottom of the box, and insulated from the base of the instrument, while the wires $y$, $y'$, and $y''$ are insulated on the under side of the base-plate, and form the circuit through the magnet E, key $h$, and key-post $h'$, which circuit is closed or broken by the action of the cams $g$ on the key $h$ when said cams are being rotated to communicate the message or sign thereof indicated by the pointer $n$ on the plate $p$. When the portable apparatus is removed the continuity of the main line is restored by the rearward lips $c$ of the springs Y Z coming in contact with the bar $c'$, by which the connection of the two wires is formed, and which connection is broken by the application of the portable apparatus to said bracket or commutator, when the circuit is completed through the instrument, or to the right or left, according to the position of the plug $q$, as before described.

What I claim herein as new, and desire to secure by Letters Patent, is—

1. The slides C C' and springs X Y Z, arranged for operation, in connection with the plates $v$ $v'$ and boss $a''$, substantially as and for the purpose described.

2. The yoke $r$, having an index-finger, $n$, in combination with the sliding cams $g$, shaft $f$, and comb $s$, substantially as shown and described.

3. In combination with the plate $p$ and index-finger $n$, the comb $s$, substantially as and for the purpose specified.

MARQUIS V. HAÜY DE FORVILLE.

Witnesses:
 PETER QUOSIG,
 CONSTANTINE DE BODISCO.